Patented Mar. 12, 1940

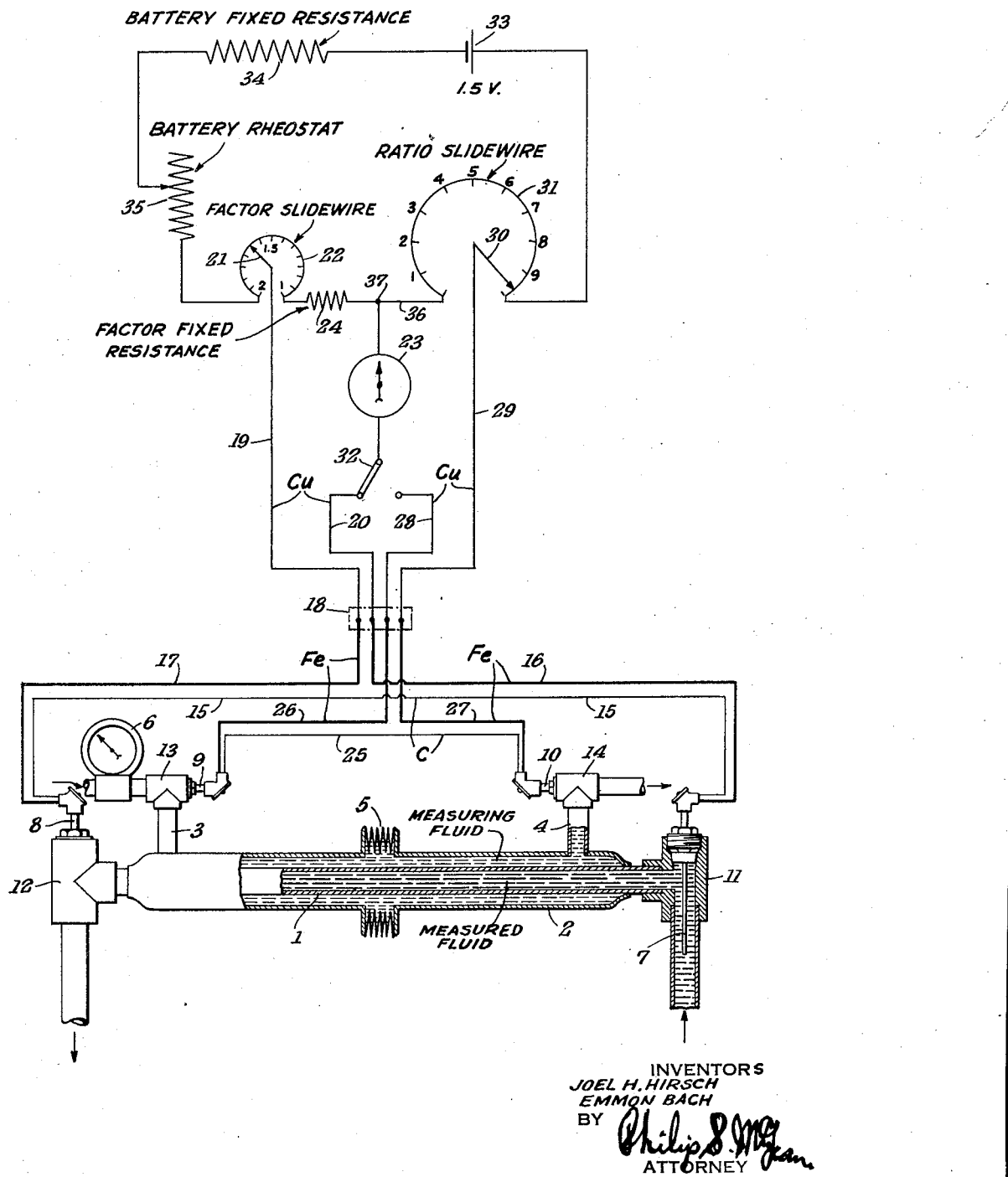

2,193,762

UNITED STATES PATENT OFFICE 2,193,762

FLOW MEASUREMENT APPARATUS

Joel H. Hirsch and Emmon Bach, New York, N. Y., assignors to Luis de Florez, New York, N. Y.

Application December 24, 1937, Serial No. 181,518

2 Claims. (Cl. 73—204)

The invention herein disclosed relates to measurement of the flow of fluids.

The measurement of some fluids involves special difficulties for which no satisfactory solution has been found. One definite example is the measurement of the heavy residual oils or "tar" undergoing processing in oil refining operations. Measurement by flowing to measuring tanks is undesirable and many times impossible because of the non-availability of such tanks and because of heat losses and other objections resulting from removing the hot oil from the normal processing flow. Available types of flow meters such as orifice and displacement meters are unsuitable because of coke and other gritty matter ordinarily present in such heavy oils and which may plug the differential lines of an orifice meter or ruin the moving parts of a displacement meter.

Special objects of the present invention are to accomplish the accurate measurement of the flow of a fluid under difficulties such as mentioned and to do so without impeding the flow or impairing the operations under way.

The measurement of the flow of liquids of a corrosive nature presents another problem which the present invention has been designed to solve.

Measurement of flow is accomplished in the present invention by heat exchange between the fluid to be measured and a fluid whose rate of flow is known, through conversion of the temperature differences to electrical values and the balancing of such values to obtain the ratio of the unknown flow to that of the known flow.

Details of the invention will appear as the specification proceeds.

The drawing accompanying and forming part of the specification illustrates one practical form of apparatus for carrying out the invention. The particular form and arrangement of parts may be varied however, all within the true intent and broad scope of the invention as hereinafter defined and broadly claimed.

The single figure in the drawing is a graphic illustration of one simple embodiment of the invention.

In the illustration, a heat exchanger is indicated in the form of a section of pipe 1, adapted to be interposed in a hot oil flow line and having about it a jacket 2, for the measuring fluid, usually water. This jacket is shown as having a supply inlet 3 and an outlet 4, and usually will have some form of expansion joint such as indicated at 5. The whole may be suitably insulated to prevent loss of heat by radiation.

A displacement meter is indicated in the water supply line at 6, and if required, a constant pressure valve and orifice may be provided to insure desired constant rate of flow.

The amount of heat exchanged is translated into electrical values in the illustration, by differential thermocouples 7, 8, at the entrance and exit ends of the hot oil passage 1, and differential thermocouples 9, 10, at the entrance and exit ends of the water jacket 2.

These thermocouples are shown as mounted in wells provided by the elbows or T-fittings 11, 12, 13, 14, which by effecting change in direction of flow also create a certain degree of turbulence and mixing to maintain substantial uniformity in temperature throughout the cross section of flow at the location of each thermocouple.

Balancing of the electrical values generated by the two sets of thermocouples to ascertain the ratio of flow of oil to water is effected by connecting the differential thermocouples in separate potentiometer circuits and by balancing these circuits against a circuit common to both and having a variable control reading in terms of ratio.

Thermocouples 7, 8, are shown as having a common connection 15, and separate connections 16, 17, to junction box 18. From the junction box terminals connections 19, 20, run to the movable switch arm 21, of a potentiometer slide wire 22, and to a galvanometer 23, connected through fixed resistance 24, with one end of said slide wire.

The water thermocouples 9, 10, are shown as having a common connection 25, and separate connections 26, 27, to junction box terminals, from whence extend connections 28, 29, to galvanometer 23, and to adjustable arm 30, of potentiometer slide wire 31.

A switch is indicated at 32, for completing either one circuit or the other through the galvanometer, enabling this single instrument to serve as a "null" indicator for both potentiometer circuits.

The comparison circuit which is common to both potentiometer circuits includes, in this illustration, a source of potential such as a battery 33, a fixed resistance 34, and a battery rheostat 35, in series with the two potentiometer resistances 22, 31, through a common connection 36, between the latter resistances and which connection includes the fixed resistance 24. The galvanometer is shown as connected at 37, in this common connection at a point between fixed resistance 24, and the second potentiometer resistance 31.

In the present example, the fluid to be measured, hot tar, has a specific gravity and a specific heat of a value less than those of the measuring fluid, water. Based on equal volume flow, the temperature rise of the water therefore will not be as great as the temperature drop of the tar, since the same quantity of heat is manifested by a greater change in temperature in the tar than in the water.

The differential thermocouples in effect detect the temperature changes in each fluid resulting from heat exchange and convert these to corresponding electrical values. With the specific heat and specific gravity of both fluids known and the quantity of measuring fluid also known, it is possible by comparing the electrical values corresponding to such temperature changes to directly determine the quantity of fluid being measured. The volume can thus be ascertained without first determining the actual temperature differences in the two fluids, it being sufficient only to have the electrical effect of their temperature changes.

Inasmuch as the temperature-E. M. F. relation of thermocouples is not a linear function, it is desirable for accuracy of the measurement to take into account the ratio of thermo-electric E. M. F.'s per degree at the existing temperature of the two fluids. The electrical values corresponding to the temperature differences will be modified to this extent.

The problem is simplified by the method outlined above and in which the ratio of the net E. M. F.'s of the thermocouples are balanced by a known ratio of voltage drops, fundamentally the potentiometer circuits of the diagram.

In a series circuit, the current flowing in all parts is the same and the ratio of voltage drop across any portions of the resistance of the circuit is however directly proportional to the ratio of such resistances. Therefore, resistances of any desired values may be selected and then by comparing their relative values under conditions of balance the ratio of the quantities of the two fluids may be directly obtained.

To consider a specific example, the fluid to be measured may be assumed to be hot tar at a mean temperature of 600° F., a specific gravity of .95 and a specific heat of .65, with water as the measuring fluid having a mean temperature of 100° F., a specific gravity of 1 and a specific heat of 1.

The factor resistance A—B, that is between the point of adjustment of slide arm 21 and the common potentiometer connection 37, may be taken as numerically equal to K derived according to the formula $$K = \frac{S_w C_w E}{S_t C_t e}$$

where
$S_w$=specific gravity of measuring fluid (water).
$C_w$=specific heat of measuring fluid.
$e$=means thermocouple E. M. F. per degree F. of measuring fluid (.029 mv. @ 100° F.).
$S_t$=specific gravity of measured fluid (hot tar).
$C_t$=specific heat of measured fluid.
$E$=mean thermocouple E. M. F. per degree F. of measured fluid (.030 mv. @ 600° F.).
(Value of $e$ and $E$ from thermo-electric tables for Iron Constantan thermocouples.)
Substituting:

$$K = \frac{\overset{\text{Sp. gr.}}{1} \times \overset{\text{Sp. ht.}}{1} \times \overset{\text{Mv. per °F.}}{.030}}{.95 \times .65 \times .029} = 1.675 \text{ (ohms)}$$

Assuming the slide wire factor resistance 22 to be 1 ohm, the fixed resistance 24 1 ohm and the ratio slide wire resistance 31 10 ohms, then with K ascertained to be 1.675 ohms, the switch arm 21 is set to the position designated 1.675 on the factor potentiometer.

After setting the factor potentiometer to effect the compensation for specific heat, specific gravity and mean E. M. F. as described, the throw-over switch 32 should be in the left hand position indicated and the battery rheostat 35, be adjusted until the voltage drop through the resistance A—B balances the net E. M. F. of the tar differential thermocouples 7, 8, as will be evidenced by the null position of the galvanometer. This operation also automatically compensates for any change of the battery E. M. F. through deterioration.

Then upon throwing switch 32 to the right, without changing the adjustment of the battery rheostat or disturbing the factor potentiometer, the switch arm 30 of the ratio potentiometer may be adjusted to a position of galvanometer balance. At such time, the ratio of tar to water flowing will be indicated directly by the value of resistance B—C, in other words the position of the arm on the potentiometer scale and which latter may be calibrated in terms of direct ratio.

Continuing the example:

If T=rate of flow of measured fluid.
W=rate of flow of measuring fluid.
$\Delta E$=E. M. F. corresponding to $\Delta T$ (temperature difference of measured fluid).
$\Delta e$=E. M. F. corresponding to $\Delta t$ (temperature difference of measuring fluid).
then $$T = K \frac{\Delta e}{\Delta E} W$$

Assuming further
W (flow of water) =10 bbl. per hr.
$\Delta t$=30° F. (entrance temperature 80° F.; exit temperature 110° F.).
$\Delta T$=5° F. (entrance temperature 600° F.; exit temperature 595° F.).

Substituting $$T = \frac{1.675(30 \times .029)10}{(5 \times .030)} = 97.15 \text{ bbl. per hour}$$

From the foregoing it will be seen that in practical use of the invention it is only necessary to set the factor potentiometer 21, 22 or see that it is properly set for the factors involved, specific gravities, specific heats and mean E. M. F.'s per degree of the measuring and measured fluid thermocouples, then, with the switch to the left, adjust the battery voltage at 35 until the galvanometer is balanced, indicating that the IR drop in the battery circuit between potentiometer slide 21 and point 37 is equal to the net E. M. F. of the differential thermocouples 7, 8, then to throw switch 32 to the right and adjust the ratio potentiometer 30, 31 for galvanometer balance, at which time the IR drop between point 37 and slide 30 will be equal to the net E. M. F. of the differential thermocouples 9, 10. As the current in the battery circuit is unchanged and of the same value at all points therein it follows that the voltage drop in any portion of this circuit is directly proportional to the resistance embraced. Hence with both thermocouple E. M. F.'s balanced against the drop through their respective resistances, the ratio of flows may be determined directly. The rate of flow of the measuring fluid being indicated by meter 6 it is only necessary to apply that value according to the ratio indicated—in the present example, ten (bbls. per hour of water) times 9.715, (the ratio shown on the potentiometer) or 97.15 (bbls. of tar per hour). If the measuring fluid flow rate were one bbl. per hour the flow rate of the measured fluid would be then 9.715 bbls. per hour, the potentiometer then becoming actually a direct reading instrument.

While particularly useful for measurement of flow of hot oil, corrosive and other fluids which can not be measured by usual methods, the invention, it will be appreciated may be applied to flow measurement of any fluids.

The invention indicates volume of measured fluid directly in terms of ratio to the known volume of measuring fluid, without requiring knowledge of actual temperature values. The reading is direct, requiring no computation or reference to tables, charts or records. Accuracy of measurement therefore is not subject to error of calculations and the like. Furthermore, since relative rather than actual temperature differences are controlling, variations in efficiency of the heat exchanger and other possibly variable factors have no effect on the accuracy or reliability of the invention.

What is claimed is:

1. Apparatus for measurement of flowing fluid, comprising a heat exchanger having passages for the fluid to be measured and for a measuring fluid, thermocouple wells at the entrance and exit ends of said passages, thermocouples mounted in said wells and means connected with said thermocouples for indicating the ratio of the electrical force of one set of thermocouples to the electrical force of the other set of said thermocouples, including a potentiometer circuit adjustable for specific heat, connected with the fluid to be measured thermocouples, a potentiometer circuit variable to indicate ratio of one fluid flow to the other connected with the measuring fluid thermocouples and a balancing circuit common to said potentiometer circuits and including balance indicating means.

2. Apparatus for measurement of flowing fluid, comprising a heat exchanger having passages for the fluid to be measured and for a measuring fluid, differential thermocouples at the entrance and exit ends of said heat exchanger passages and means connected with said differential thermocouples for indicating the ratio of the electrical force of one set of differential thermocouples to the electrical force of the other set of differential thermocouples, including a potentiometer circuit adjustable for specific heat, connected with the fluid to be measured thermocouples, a potentiometer circuit variable in accordance with ratio of one fluid flow to the other, connected with the measuring fluid thermocouples and a balancing circuit common to said potentiometer circuits.

JOEL H. HIRSCH.
EMMON BACH.